(12) United States Patent
Yoshimuta

(10) Patent No.: US 9,602,033 B2
(45) Date of Patent: Mar. 21, 2017

(54) MOTOR CONTROL APPARATUS, MOTOR-DRIVEN APPARATUS, METHOD OF CONTROLLING MOTOR AND NON-TRANSITORY COMPUTER-READABLE RECORDING MEDIUM STORING A COMPUTER PROGRAM

(71) Applicant: CANON KABUSHIKI KAISHA, Tokyo (JP)

(72) Inventor: Junki Yoshimuta, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 128 days.

(21) Appl. No.: 14/331,911

(22) Filed: Jul. 15, 2014

(65) Prior Publication Data

US 2015/0022130 A1    Jan. 22, 2015

(30) Foreign Application Priority Data

Jul. 19, 2013  (JP) .................................. 2013-149986

(51) Int. Cl.
*H02P 6/12*       (2006.01)
*H02P 7/00*       (2016.01)
(Continued)

(52) U.S. Cl.
CPC .................. *H02P 6/24* (2013.01); *G03B 3/10* (2013.01); *G03B 5/00* (2013.01); *H02P 6/28* (2016.02);
(Continued)

(58) Field of Classification Search
CPC ...... H02P 8/08; H02P 6/08; H02P 8/14; H02P 8/26; H02P 6/24; H02P 6/28;
(Continued)

(56) References Cited

U.S. PATENT DOCUMENTS 4,963,808 A * 10/1990 Torisawa ............... H02K 29/08
318/254.2
6,462,503 B1 * 10/2002 Narazaki ................... H02P 8/10
318/685

(Continued)

FOREIGN PATENT DOCUMENTS

JP         08-063228 A      3/1996
JP      2004-129452 A      4/2004

*Primary Examiner* — Bentsu Ro
*Assistant Examiner* — Zemenay Truneh
(74) *Attorney, Agent, or Firm* — Rossi, Kimms & McDowell LLP

(57) ABSTRACT

The motor control apparatus controlling rotation of a brushless motor includes a controller to control an angular velocity of the motor, and a load torque calculator to calculate a load torque at which the motor drives a driven member, by using a detection signal output from a rotation detector to output the detection signal in response to the rotation of the motor. When the motor drives the driven member toward a target stop position, the controller calculates a deceleration rotation amount, which is a remaining rotation amount of the motor at start of deceleration of the motor from its drive state that is one of an acceleration state and a constant velocity state, and controls the angular velocity of the motor on a basis of the deceleration rotation amount. The controller calculates the deceleration rotation amount by using the load torque calculated in the drive state.

13 Claims, 8 Drawing Sheets

(51) Int. Cl.
  *H02P 6/24* (2006.01)
  *G03B 3/10* (2006.01)
  *G03B 5/00* (2006.01)
  *F16M 11/04* (2006.01)

(52) U.S. Cl.
  CPC ...... *F16M 11/04* (2013.01); *G03B 2205/0046* (2013.01); *G03B 2205/0053* (2013.01)

(58) Field of Classification Search
  CPC .... G05B 19/404; G05B 19/232; F16M 11/18; G03B 3/10; G03B 5/00
  USPC .............................................. 318/400.15, 432
  See application file for complete search history.

(56) References Cited

U.S. PATENT DOCUMENTS

| | | | |
|---|---|---|---|
| 2004/0263102 A1* | 12/2004 | Kraus .................... | F16M 11/04 318/432 |
| 2005/0093490 A1* | 5/2005 | Shoji .................... | G05B 19/404 318/60 |
| 2012/0050897 A1* | 3/2012 | Akada ....................... | H02P 6/16 359/824 |

* cited by examiner

MOTOR CONTROL APPARATUS, MOTOR-DRIVEN APPARATUS, METHOD OF CONTROLLING MOTOR AND NON-TRANSITORY COMPUTER-READABLE RECORDING MEDIUM STORING A COMPUTER PROGRAM

BACKGROUND OF THE INVENTION

Field of the Invention

The present invention relates to a motor control apparatus which controls drive of a motor, and particularly to a motor control apparatus which controls drive of a brushless motor including an encoder which detects rotation of a rotor of the brushless motor.

Description of the Related Art

Performing feedback control of a brushless motor provided with an encoder which detects rotation of a rotor thereof by using an output signal from the encoder enables driving the motor at a high velocity without causing loss of synchronization thereof. Such a brushless motor which can be driven at a high velocity requires in its control a stop position accuracy to stop a driven member to be driven by the motor accurately at a target stop position.

For ensuring such a stop position accuracy, an acceleration (deceleration) of the motor in its deceleration state from its constant-velocity state or its acceleration state and a rotation amount of the rotor in the deceleration state, namely, a drive amount of the driven member (hereinafter referred to as "a deceleration drive amount") are important. A higher deceleration in the deceleration state enables decelerating the driven member toward the target stop position in a shorter time. This means that such a higher deceleration enables reducing the deceleration drive amount, that is, increasing a drive amount of the driving member in the constant velocity state or the acceleration state, which makes it possible to reduce a drive time required for driving the driven member to the target stop position. However, a high deceleration with a small deceleration drive amount may result in a situation that the driven member stops beyond the target stop position.

Japanese Patent Laid-Open No. 2004-129452 discloses a technique which switches an energization phase of a motor with increase of a count value of pulse signals output from an encoder in response to rotation of the motor to control drive of the motor. More specifically, this technique corrects a phase advance amount, which is a phase difference of the energization phase from a rotational phase of a rotor of the motor, to adjust a braking force, namely, an acceleration (deceleration), which results in an improvement in stop position accuracy. Similarly, Japanese Patent Laid-Open No. 8-63228 discloses a technique which changes a timing of outputting a stop instruction for a movable member based on a velocity variation time in which the movable member is accelerated or decelerated from a constant velocity state toward another velocity state or on a velocity variation time in which the movable member is accelerated from a stop state to a predetermined velocity state. This technique aims to stably ensure a stop position accuracy even in case of occurring a sudden environmental change or an aging variation.

The technique disclosed in Japanese Patent Laid-Open No. 2004-129452 corrects the phase advance amount, taking a rotational angle of the motor from a current position to a target position into consideration. That is, if a timing of decelerating the rotor delays due to any causes, the technique increases the braking force applied to the rotor to perform deceleration control before the target stop position. However, since the acceleration depends on the braking force of a driving system, the upper limit thereof the acceleration is limited depending on a system concerned. Moreover, the upper limit varies due to manufacturing errors. The technique disclosed in Japanese Patent Laid-Open No. 2004-129452 does not take into consideration not only a difference of the braking force caused by an individual difference and an operation state of the driving system, but also the deceleration drive amount.

On the other hand, the technique disclosed in Japanese Patent Laid-Open No. 8-63228 sets a deceleration and stop timing based on the velocity variation time in which the movable member is accelerated or decelerated for its velocity change or is accelerated from the stop state and on a velocity variation and a velocity deviation while a constant-velocity-operation instruction is given. That is, this technique is designed to ensure the stop position accuracy by obtaining characteristics changes due to the aging variation or the like and by appropriately setting the deceleration drive amount. However, this technique is not enough to ensure the stop position accuracy in a case where a constant velocity state is not present because this technique requires the presence of the constant velocity state during the drive of the movable member as a precondition.

SUMMARY OF THE INVENTION

The present invention provides a motor control apparatus capable of stopping a driven member to be driven by a motor at a target stop position with a good accuracy, even when there are an individual difference of the motor due to a manufacturing variation or the like and a load variation. The present invention further provides a method of controlling the motor and a non-transitory computer-readable recording medium storing a computer program for implementing the method.

The present invention provides as an aspect thereof a motor control apparatus configured to control rotation of a brushless motor. The motor control apparatus includes a controller configured to control an angular velocity of the motor, and a load torque calculator configured to calculate a load torque at which the motor drives a driven member, by using a detection signal output from a rotation detector configured to output the detection signal in response to the rotation of the motor. The controller is configured to, when the motor drives the driven member toward a target stop position, calculate a deceleration rotation amount, which is a remaining rotation amount of the motor at start of deceleration of the motor from its drive state that is one of an acceleration state and a constant velocity state, and control the angular velocity of the motor on a basis of the deceleration rotation amount. The controller is configured to calculate the deceleration rotation amount by using the load torque calculated in the drive state.

The present invention provides as another aspect thereof a motor-driven apparatus including a brushless motor, a driven member to be driven by the motor, and the above motor control apparatus configured to control drive of the motor.

The present invention provides as still another aspect thereof a method of controlling rotation of a brushless motor. The method includes calculating a load torque at which the motor drives a driven member, by using a detection signal output in response to the rotation of the motor, calculating, when the motor drives the driven member toward a target stop position, a deceleration rotation amount which is a remaining rotation amount of the motor at start of deceleration of the motor from its drive state that is one of an acceleration state and a constant velocity state, and controlling an angular velocity of the motor on a basis of the deceleration rotation amount. The load torque is calculated by using the load torque calculated in the drive state.

The present invention provides as yet still another aspect thereof a non-transitory computer-readable recording medium storing a computer program to cause a computer which controls rotation of a brushless motor to execute the following processes: calculating a load torque at which the motor drives a driven member, by using a detection signal output in response to the rotation of the motor; calculating, when the motor drives the driven member toward a target stop position, a deceleration rotation amount which is a remaining rotation amount of the motor at start of deceleration of the motor from its drive state that is one of an acceleration state and a constant velocity state; and controlling an angular velocity of the motor on a basis of the deceleration rotation amount. The load torque is calculated by using the load torque calculated in the drive state.

Other aspects of the present invention will become apparent from the following description and the attached drawings.

DESCRIPTION OF THE EMBODIMENTS

Exemplary embodiments of the present invention will be described below with reference to the attached drawings.

Each of the following embodiments aims as an object thereof to set a timing of starting deceleration of a motor so as to stop a driven member at a target stop position with a good accuracy without an overshoot, even when a load of the motor which drives the driven member varies. The variation of the load (hereinafter referred to as "a load variation") in the following description includes a load variation which occurs due to an individual difference among motors, such as a manufacturing variation and an aging variation, and a load variation depending on a conditional change during drive of the driven member, such as a temperature environment change and an attitude change.

Embodiment 1

Figure 1:
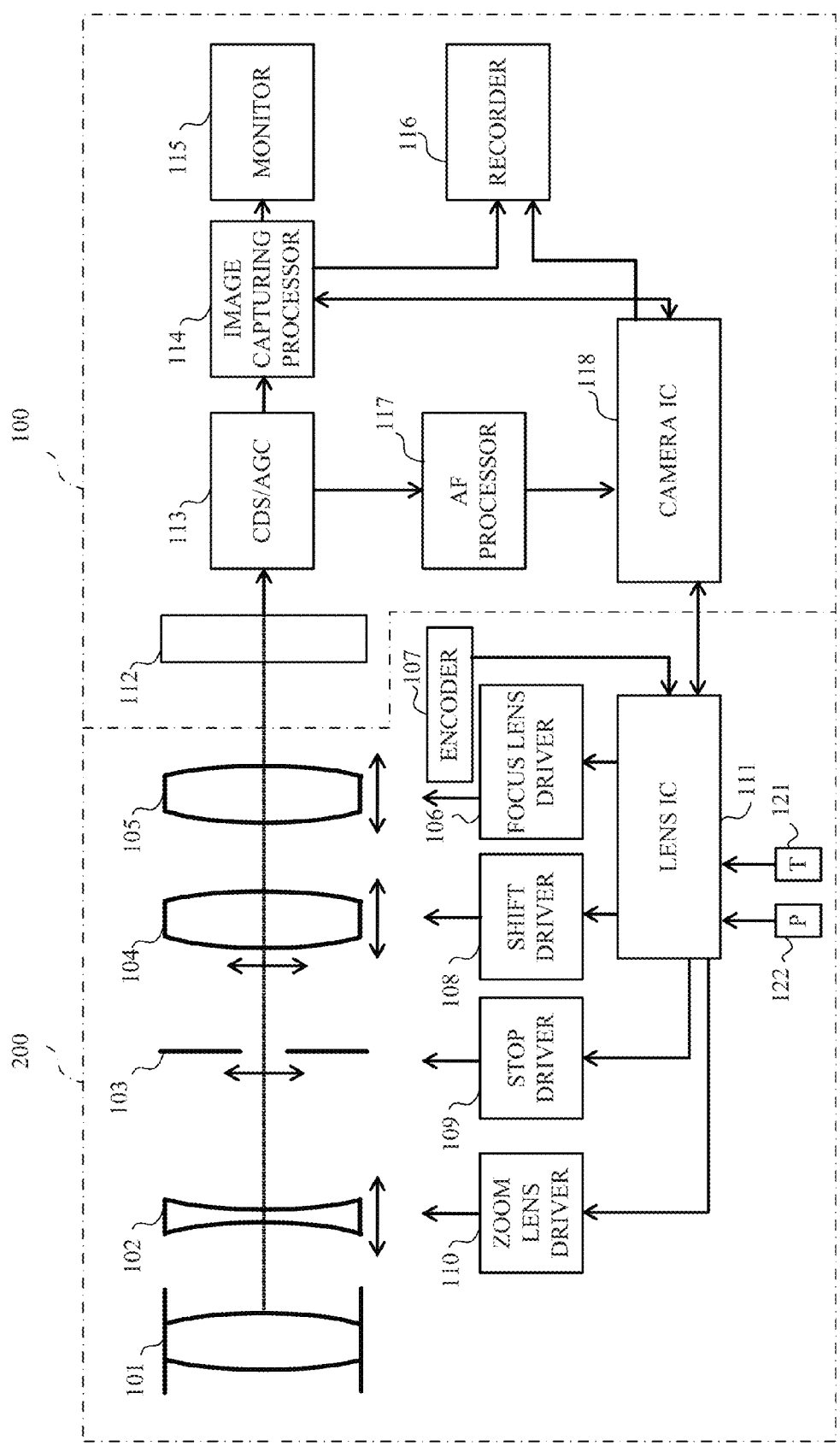
FIG. 1 is a block diagram illustrating a configuration of a digital single-lens reflex camera that is Embodiment 1 of the present invention.

FIG. 1 illustrates a configuration of an interchangeable lens 200 as a motor-driven apparatus that is a first embodiment (Embodiment 1) of the present invention. FIG. 1 further illustrates a configuration of a digital single-lens reflex camera (hereinafter simply referred to as "a camera") 100 as an image capturing apparatus to which the interchangeable lens 200 is detachably attached. The image capturing apparatus may alternatively be a digital still camera, a digital video camera, a lens-integrated camera or a microscope.

The interchangeable lens 200 includes an image capturing optical system constituted by, in order from an object side, a fixed lens 101, a zoom lens 102, an aperture stop 103, an image-stabilizing lens 104 and a focus lens (optical element) 105. The zoom lens 102 is moved in an optical axis direction to vary a magnification of the image capturing optical system. The focus lens 105 is moved in the optical axis direction to perform focusing. The aperture stop 103 increases or decreases its aperture diameter to change an amount of light transmitted therethrough. The image-stabilizing lens (shift lens) 104 is moved (shifted) in a direction orthogonal to the optical axis direction to reduce (correct) an image blur caused by a camera shake due to hand jiggling and the like.

In addition, the interchangeable lens 200 includes a zoom lens driver 110 which drives the zoom lens 102, a stop driver 109 which drives the aperture stop 103, a shift driver 108 which drives the image-stabilizing lens 104 and a focus lens driver 106 which drives the focus lens 105. Each driver includes an actuator, such as a motor, serving as a driving source. Each driver is controlled by a lens IC 111 serving as a lens controller, provided in the interchangeable lens 200.

In response to a user's operation of a zoom ring (not illustrated) provided to the interchangeable lens 200, the lens IC 111 drives, depending on an amount of the operation, the zoom lens 102 via the zoom lens driver 110. An operation position of the zoom lens 102 is electrically detected, and the lens IC 111 calculates based thereon a drive direction and a drive amount of the focus lens 105 in order to maintain an in-focus state and then provides to the focus lens driver 106 a zoom-tracking drive instruction containing those drive direction and drive amount. Similarly, in response to a user's operation of a manual focus ring (not illustrated) provided to the interchangeable lens 200, the lens IC 111 calculates, depending on an amount of the operation, a drive amount of the focus lens 105 and then provides to the focus lens driver 106 a manual focus instruction containing that drive amount. Furthermore, as described later, upon receipt of an AF drive instruction from a camera IC 118, the lens IC 111 performs autofocus (AF) by moving the focus lens 105 via the focus lens driver 106.

Moreover, upon receipt of a stop drive instruction based on a photometry result from the camera IC 118, the lens IC 111 drives the aperture stop 103 via the stop driver 109. Furthermore, the lens IC 111 shifts the image-stabilizing lens 104 via the shift driver 108 based on a lens shake (i.e., the camera shake) due to the hand jiggling or the like; the lens shake is detected by a shake sensor (attitude sensor) 122, such as a gyrosensor, provided to the interchangeable lens 200.

On the other hand, the camera 100 includes an image sensor 112, as a photoelectric conversion element, constituted by a CCD sensor or a CMOS sensor, a CDS/AGC circuit 113 which samples output of the image sensor 112 and controls a gain, and an image capturing processor 114. The image capturing processor 114 performs, according to commands from the camera IC 118 as a camera controller, various image processes on an output signal from the CDS/AGC circuit 113 to produce a captured image. The produced captured image is displayed on a monitor 115 or recorded by a recorder 116 to a recording medium (not illustrated) such as a semiconductor memory.

In addition, the camera 100 includes an AF processor 117. The AF processor 117 extracts a high frequency component and a brightness difference component from, of the output signals of all pixel from the CDS/AGC circuit 113, output signals of pixels used for focus detection to produce an AF evaluation signal. The camera IC 118 searches for a position (in-focus position) of the focus lens 105 at which the value of the AF evaluation signal (AF evaluation value) reaches its peak and then outputs a focus lens drive instruction to the lens IC 111 to cause the lens IC 111 to move the focus lens 105 to the in-focus position. The lens IC 111 controls, according to the focus lens drive instruction, energization of an exciting coil of a motor 106a via the focus lens driver 106. The lens IC 111 thereby controls drive of the motor 106 and its angular velocity (acceleration, constant velocity and deceleration), which controls movement of the focus lens 105 and its movement velocity. An autofocus (AF) control is performed in this manner.

Figure 2:
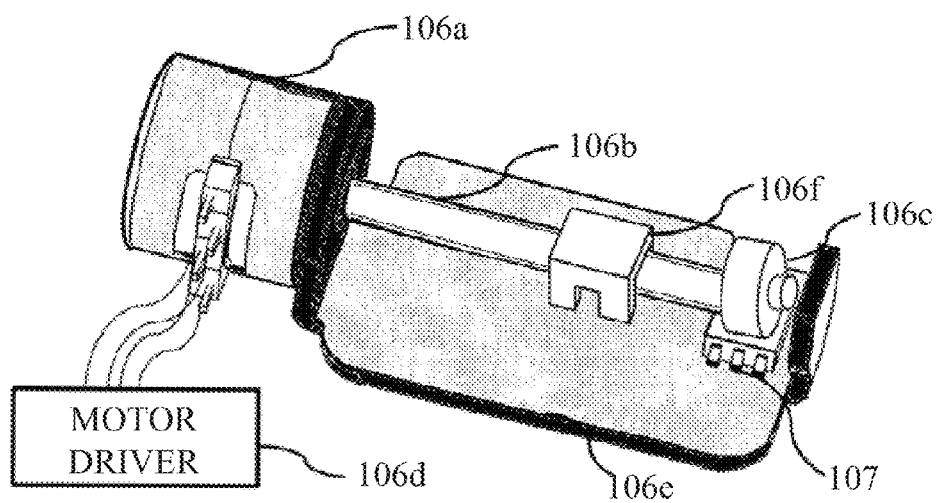
FIG. 2 is an external perspective view of a motor unit including a stepping motor in Embodiment 1.
Figure 3:
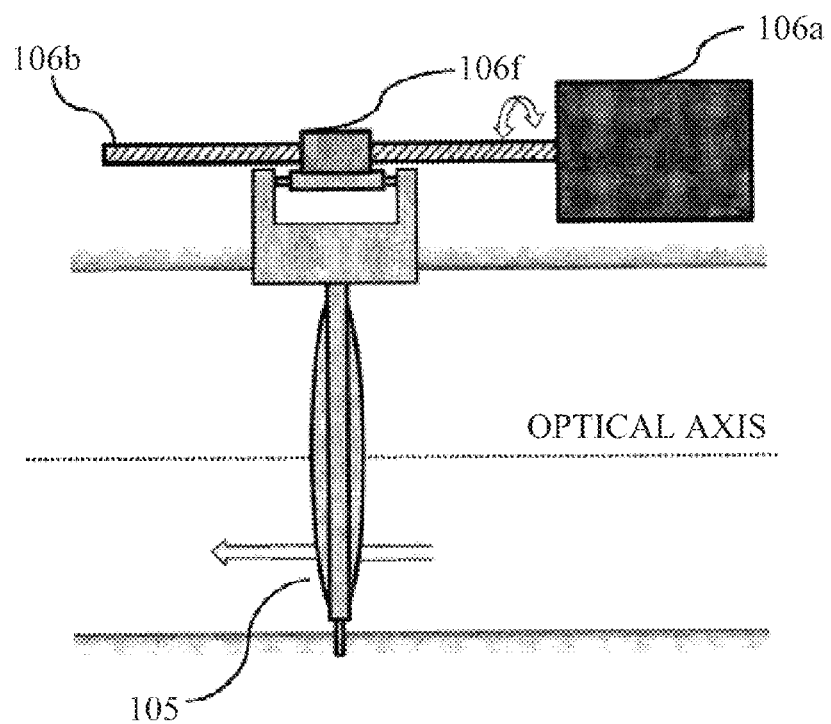
FIG. 3 is a flowchart illustrating an operation for contrast AF in Embodiment 1.

FIGS. 2 and 3 illustrate a configuration of a focus lens motor unit included in the focus lens driver 106. The focus lens motor unit includes a stepping motor 106a as a brushless motor, and a lead screw 106b which is an output shaft of the motor 106a. The stepping motor 106a and the lead screw 106b are held by a motor holder 106e. The brushless motor is not limited to a stepping motor and may alternatively be a reluctance motor or other brushless motors.

The focus lens motor unit further includes an encoder magnet 106c attached to one end portion of the lead screw 106b so as to integrally rotate with the lead screw 106b, and a hole IC 107 held by the motor holder 106e. The encoder magnet 106c and a magnet rotor (not illustrated) in the motor 106a are each formed of a cylindrical permanent magnet and their outer circumferential surfaces are magnetized in the same number of poles (10 poles in this embodiment). The hole IC 107 converts change of a magnetic flux density caused by rotation of the encoder magnet 106c into two phase signals (pulse signals) whose phases are different from each other and each of which has two values. The hole IC 107 outputs the two phase signals as electric signals (detection signals) indicating rotation of the stepping motor 106a. The hole IC 107 and the encoder magnet 106c constitute an encoder as a rotation detector. The encoder is not limited to a digital encoder outputting the two-valued signal as described in this embodiment and may alternatively be an analog encoder outputting a sinusoidal signal. Moreover, the encoder is not limited to a magnetic encoder as described in this embodiment and may be an optical encoder constituted by a photo sensor and a rotatable plate in which one of a reflective pattern and transmissive slits is formed.

The focus lens motor unit still further includes a motor driver 106d to energize the exciting coil (not illustrated) of the motor 106a and a rack 106f engaged with the lead screw 106b. The rack 106f is attached to the focus lens 105 (actually to a focus lens holding frame which is a member to hold the focus lens 105) as illustrated in FIG. 3. With this configuration, rotation of the motor 106a rotates the lead screw 106b, which drives the focus lens 105 via the rack 106f in the optical axis direction in which the lead screw 106b extends.

The AF control performed by the camera IC 118 and the lens IC 111 will be described. The camera IC 118 and the lens IC 111 each serving a computer perform their operations for the AF control according to computer programs stored therein. Although a contrast AF is employed as an AF method in this embodiment, a phase difference AF may be employed instead thereof or in combination therewith. The contrast AF searches for the in-focus position at which the AF evaluation value reaches its peak while performing a minute reciprocating drive (hereinafter referred to as "a wobbling drive) of the focus lens 105 and finally moves the focus lens 105 to the in-focus position to obtain the in-focus state for an object to be captured.

Figure 4:
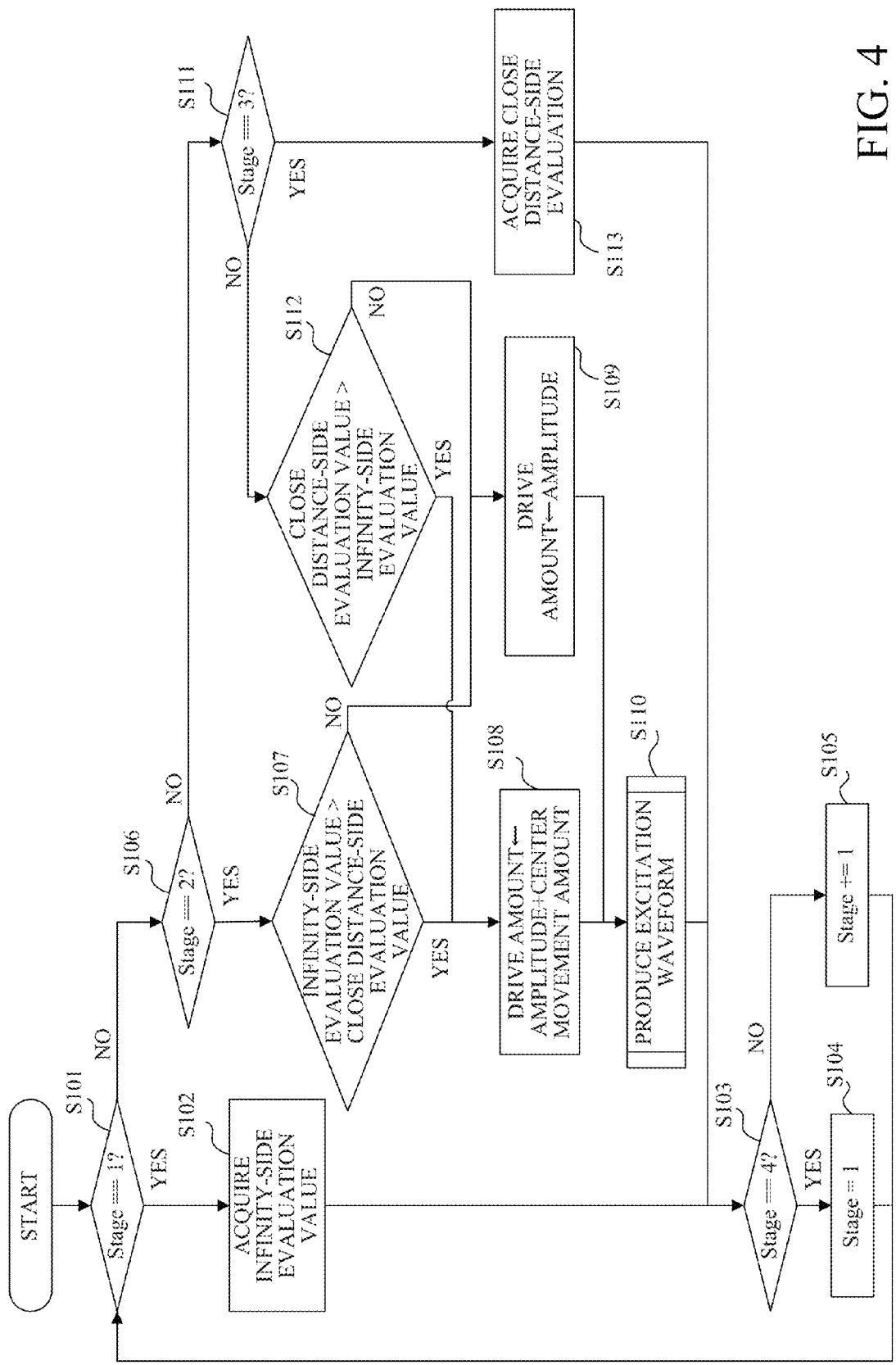
FIG. 4 illustrates a drive mechanism for a focus lens by the stepping motor in Embodiment 1.

FIG. 4 illustrates a flowchart of the operations performed by the camera IC 118 and the lens IC 111 to drive the focus lens 105 in one reciprocating motion in the wobbling drive. First, description of operations in Stage=1 to 4 (hereinafter respectively referred to as "Stage 1", "Stage 2", "Stage 3", and "Stage 4") illustrated in the flowchart of FIG. 4 will be made.

At Stage 1, the focus lens 105 is located at a close distance side in the wobbling drive. The camera IC 118 acquires, at Stage 1, an AF evaluation value at an infinity side by using output from the image sensor 112 based on electric charges accumulated therein in a state where the focus lens 105 is located at the infinity side at previous Stage 3.

At Stage 2, the camera IC 118 drives the focus lens 105 via the lens IC 111 by a predetermined amplitude from the close distance side to the infinity side. In this drive of the focus lens 105, if the AF evaluation value at the infinity side acquired at Stage 1 is higher than that at the close distance side acquired at previous Stage 3, the camera IC 118 moves also a center position of the wobbling drive by a predetermined center movement amount to the infinity side.

At Stage 3, the focus lens 105 is located at the infinity side in the wobbling drive. The camera IC 118 acquires, at Stage 3, an AF evaluation value at the close distance side by using output from the image sensor 112 based on electric charges accumulated therein in a state where the focus lens 105 is located at the close distance side at previous Stage 1.

At Stage 4, the camera IC 118 drives the focus lens 105 via the lens IC 111 by a predetermined minute amount from the infinity side to the close distance side. In this drive of the focus lens 105, if the AF evaluation value at the close distance side acquired at Stage 3 is higher than that at the infinity side acquired at previous Stage 1, the camera IC 118 moves also the center position of the wobbling drive by the predetermined amount to the close distance side.

In the flowchart of FIG. 4, at step S101, the camera IC 118 determines whether or not the value of Stage is 1. The camera IC 118 proceeds to step S102 if determining that the value is 1 and proceeds to step S106 if determining that the value is not 1.

At step S102, the camera IC 118 performs the process of Stage 1. That is, the camera IC 118 causes the AF processor 117 to calculate the AF evaluation value at the infinity side. After acquiring the AF evaluation value at the infinity side, the camera IC 118 proceeds to step S103.

At step S103, the camera IC 118 determines whether or not the value of Stage is 4. The camera IC 118 proceeds to step S104 if determining that the value is 4 and proceeds to step S105 if determining that the values is not 4.

At step S105, the camera IC 118 increments the value of Stage by 1 and then returns to step S101.

At step S106, the camera IC 118 determines whether or not the value of Stage is 2. The camera IC 118 proceeds to step S107 if determining that the value is 2 and proceeds to step S111 if determining that the value is not 2.

At step S107, the camera IC 118 performs the process of Stage 2. That is, the camera IC 118 compares the AF evaluation value at the infinity side acquired at Stage 1 (step S102) with that at the close distance side acquired at Stage 3 (step S113). The camera IC 118 proceeds to step S108 if determining that the AF evaluation value at the infinity side is higher than that at the close distance side and proceeds to step S109 if not.

In the case where the camera IC 118 proceeds from step S107 to step S108, the camera IC 118 sets the drive direction of the focus lens 105 (hereinafter referred to as "a focus lens drive direction") to the infinity side. In addition, the camera IC 118 sets the drive amount of the focus lens 105 (hereinafter referred to as "a focus lens drive amount") as follows. The camera IC 118 regards the AF evaluation value as becoming higher (that is, an in-focus position as being located) at a further infinity side, the camera IC 118 sets the focus lens drive amount to the infinity side by adding, to the amplitude of the wobbling drive, the center movement amount by which the center position of the wobbling drive is shifted to the infinity side. The camera IC 118 then proceeds to step S110. On the other hand, in the case where the camera IC 118 proceeds from step S107 to step S109, the camera IC 118 sets the focus lens drive direction to the infinity side and sets the focus lens drive amount to the amplitude of the wobbling drive, without adding the above-mentioned center movement amount thereto. After that, the camera IC 118 proceeds to step S110.

At step S110, the camera IC 118 provides to the lens IC 111 a focus lens drive instruction containing the focus lens drive amount and the focus lens drive direction each of which is set at step S108 or S109 with a predetermined drive velocity of the focus lens 105 at which the wobbling drive is performed. The lens IC 111 provides to the focus lens driver 106 a drive instruction in response to the focus lens drive instruction received from the camera IC 118. In this process, the lens IC 111 provides to the focus lens driver 106 that drive instruction after it performs, as required, corrections taking statuses of the focus lens 105 and all the other members related to the drive of the focus lens 105 (for example, a voltage limitation during concurrent drive with other drivers) into consideration. The focus lens driver 106 produces an excitation signal (excitation waveform) corresponding to the drive instruction at the motor driver 106d and then drives the motor 106a to drive the focus lens 105 by a drive amount and in a direction both corresponding to the drive instruction. After that, the camera IC 118 proceeds to step S103.

At step S111, the camera IC 118 determines whether or not the value of Stage is 3. The camera IC 118 proceeds to step S113 if determining that the value is 3 and proceeds to step S112 if determining that the value is not 3.

At step S113, the camera IC 118 performs the process of Stage 3. That is, the camera IC 118 causes the AF processor 117 to calculate the AF evaluation value at the close distance side. After acquiring the AF evaluation value at the close distance side, the camera IC 118 proceeds to step S103.

At step S112, the camera IC 118 performs the process of Stage 4. That is, the camera IC 118 compares the AF evaluation value at the close distance side acquired at Stage 3 (step S113) with that at the infinity side acquired at the previous Stage 1 (step S102). The camera IC 118 proceeds to step S108 if determining that the AF evaluation value at the close distance side is higher than that at the infinity side and proceeds to step S109 if not.

In the case where the camera IC 118 proceeds from step S112 to step S108, the camera IC 118 sets the focus lens drive direction to the close distance side. In addition, the camera IC 118 sets the focus lens drive amount as follows. The camera IC 118 regards the AF evaluation value as becoming higher (that is, an in-focus position as being located) at a closer distance side), the camera IC 118 sets the focus lens drive amount on the close distance side by adding the center movement amount by which the center position of the wobbling drive is shifted to the close distance side to the amplitude of the wobbling drive. The camera IC 118 then proceeds to step S110. On the other hand, in the case where the camera IC 118 proceeds from step S112 to step S109, the camera IC 118 sets the focus lens drive direction to the close distance side and sets the focus lens drive amount to the amplitude of the wobbling drive without adding the above center movement amount thereto. After that, the camera IC 118 proceeds to step S110 and, as described above, provides to the lens IC 111 the focus lens drive instruction to drive the focus lens 105. The camera IC 118 then proceeds to step S103.

At step S104, the camera IC 118 returns the value of Stage to 1 and then returns to step S101.

In such a manner, moving the focus lens 105 in a direction in which the AF evaluation value increases through repetition of the wobbling drive of the focus lens 105 and the center movement thereof enables detecting the in-focus position at which the AF evaluation value reaches its peak.

Since the focus lens drive direction and the focus lens drive amount are frequently changed depending on movements of the object and other changes, the camera IC 118 may provide to the lens IC 111 new focus lens drive instructions even during the drive (including acceleration and deceleration) of the focus lens 105. Therefore, it is desirable to calculate and update, at a predetermined cycle, a deceleration displacement angle which is a rotation amount of the motor 106a corresponding to the drive amount of the focus lens 105 during the deceleration. In this embodiment, such a deceleration displacement angle is updated at a predetermined displacement angle cycle of the motor 106a, for example, at each change in the output from the hole IC 107. The deceleration displacement angle may, however, be updated at a predetermined time cycle or at both of the predetermined time cycle and the predetermined displacement angle cycle.

In this embodiment, as described later in detail, the stepping motor 106a is driven by using open-loop control and feedback control (closed-loop control). More specifically, the stepping motor 106a is driven by the feedback control when being driven at a high velocity and is driven by the open-loop control when being driven at a medium or low velocity or by a small drive amount. The calculation of the deceleration displacement angle described below is applicable also to cases where either of the open-loop control or the feedback control is performed.

The focus lens 105 is required to move at a high velocity to the target stop position apart from its position before the movement by the focus lens drive amount contained in the focus lens drive instruction from the camera IC 118 and to stop thereat with a good accuracy. For this reason, the lens IC 111 calculates, from a current angular velocity ω of the motor 106a, a rotation amount of the motor 106a required to its stop, that is, the above-mentioned deceleration displacement angle (in other words, a deceleration rotation amount) θ which is a remaining rotation amount of the motor 106a at start of its deceleration. The lens IC 111 then performs a scheduling up to stop of the motor 106a at the predetermined displacement angle cycle. The deceleration displacement angle θ varies depending not only on the angular velocity ω, but also on an angular acceleration α. Thus, the lens IC ill calculates the deceleration displacement angle θ by using multiple variables containing the angular velocity ω and the angular acceleration α. The lens IC 111 serves as an acceleration calculator, a load torque calculator and a controller.

Description below will be made of a method of calculating the deceleration displacement angle θ by which an arbitrary angular velocity ω is decelerated to an angular velocity $\omega_{stop}$ at which a stop position accuracy can be ensured or to an angular velocity of 0. This calculation method, however, is applicable also to a deceleration which does not lead to a stop.

The lens IC 111 calculates the deceleration displacement angle θ required to decelerate and stop the motor 106a from its driven state it by using expression (1), which is an equation of motion of the motor 106a.

$$I\frac{d^2\theta}{dt^2} + D\frac{d\theta}{dt} + T_L = T_m \tag{1}$$

The first term of expression (1) indicates an acceleration torque represented by a product of an inertia moment I and an angular acceleration $d^2\theta/dt^2$ (hereinafter abbreviated as "α"). The second term of expression (1) indicates a viscosity resistance represented by a product of a viscosity coefficient D and an angular velocity $d\theta/dt$ (hereinafter abbreviated as "ω"). Furthermore, the third term of expression (1) indicates a load torque $T_L$. The total sum of the left-hand side of expression (1) is equivalent to a torque $T_m$ generated by the motor 106a.

A workload (product of the generated torque Tm and the deceleration displacement angle θ) of the motor 106a required for deceleration from a current angular velocity ω to a deceleration target angular velocity $\omega_{stop}$ at which a stop position accuracy can be ensured is represented by expression (2).

$$T_m \cdot \theta = \frac{1}{2} \cdot I \cdot (\omega^2 - \omega_{stop}^2) \tag{2}$$

From expressions (1) and (2), the deceleration displacement angle θ required for deceleration and stop of the motor 106a is represented by expression (3).

$$\theta = \frac{1}{2} \cdot \frac{I}{I \cdot \alpha + D \cdot \omega + T_L} \cdot (\omega^2 - \omega_{stop}^2) \tag{3}$$

In expression (3), the inertia moment I and the viscosity coefficient D are constant terms. The deceleration target angular velocity $\omega_{stop}$ is set uniquely as an angle at which an overshoot with respect to the target stop position does not occur. The angular velocity ω and the angular acceleration α are calculated using a change cycle of the output signal from the hole IC 107. For this reason, calculating the load torque $T_L$ results in unique setting of the deceleration displacement angle θ taking the load variation into consideration.

In the drive mechanism including the motor 106a and the focus lens 105 which is illustrated in FIG. 3, a rotation torque generated by the motor 106a is converted via the rack 106f to a drive force in an axis direction of the screw 106b. The resulting drive force drives the focus lens 105 in the optical axis direction. The load torque $T_L$ in the drive mechanism illustrated in FIG. 3 is represented by following expression (4).

$$T_L = \frac{F \cdot P_B}{2\pi \cdot \eta} + \frac{\mu_0 \cdot F_0 \cdot P_B}{2\pi} \tag{4}$$

In expression (4), the first term is represented by a load F [N] in a drive direction, namely, the optical axis direction, and a lead $P_B$ [m/rev] and an efficiency η of the lead screw 106b. The load F in the drive direction is represented by a sum of an external force and a gravity acceleration g [m/s$^2$] which is applied to a total mass m [kg] of the driven members such as the focus lens 105, the focus lens holding frame and the like.

In this embodiment, assuming that the external force can be disregarded because the focus lens 105 is disposed in a lens barrel (not illustrated), the load F in the drive direction is represented by expression (5).

$$F = m \cdot g(\sin\xi + \mu \cdot \cos\xi) \tag{5}$$

In expression (5), the first term represents a force of the gravity acceleration applied in the drive direction, and the second term represents a force orthogonal to the force indicated by the first term; the force represented by the first term indicates a magnitude of a sliding friction on a sliding surface. Symbol ζ denotes an angle formed by the drive direction and the optical axis, and symbol μ denotes a friction coefficient of the sliding surface. That is, since the load F in the drive direction varies depending on a relation between the optical axis direction and the gravity direction, the first term of expression (4), which represents the load torque, varies depending on an attitude of the interchangeable lens 200 (that is, of the camera 100). For instance, when ζ is 0 [deg], that is, the drive direction and the optical axis are parallel to each other and both of them extend in a direction orthogonal to a gravity direction (that is, in a horizontal direction), the first term and the second term of expression (5) are 0 and 1, respectively. This means that only a frictional force on the sliding surface works.

In expression (4), the second term is represented by a biased load $F_0$ [N] and a friction resistance $\mu_0$ of the rack 106f and the lead $P_B$ [m/rev] of the lead screw 106b. When assuming that the biased load $F_0$ is a constant term, the load torque $T_L$, which is represented by expression (4), varies depending on the attitude described above, a temperature change related to the friction coefficient and the manufacturing variation of each individual motor.

The attitude can be detected (estimated) using an output from the attitude sensor 122 described above. The temperature change can be detected (measured) using a temperature sensor 121 provided in the interchangeable lens 200. In this embodiment, since the gravity acceleration g applied to the total mass of the driven members is sufficiently smaller than the biased load $F_0$ of the rack 106f, the entire load torque $T_L$ is estimated without providing various sensors to measure respective elements of the load torque $T_L$. However, the load torque $T_L$ may be derived from expressions (4) and (5) by using the outputs from the temperature sensor 121 and the attitude sensor 122, and the load torque $T_L$ may be derived in whatever process.

Although this embodiment describes the case where the load torque $T_L$ is calculated by simplified calculation using expressions (4) and (5), a calculation taking into consideration a loss caused by engagement of the lead screw 106b with the rack 106f, a biasing force generated by a spring or the like to eliminate backlash for the focus lens holding frame, a temperature change in viscosity resistance of a grease and the like as variation factors (or variation elements) of the load torque $T_L$ results in an increase in accuracy of the estimation of the load torque. It is therefore desirable to appropriately formulate the load torque $T_L$ according to the actual configuration of the drive mechanism of the focus lens 105 to clarify the variation elements of the load torque $T_L$.

It is not necessarily needed that both of the attitude and the temperature are the variable elements of the load torque $T_L$, and at least one of these may be the variation element.

In this embodiment, the load torque $T_L$ is calculated from expression (1) in each of an acceleration drive state (hereinafter simply referred to as "an acceleration state") and a constant velocity drive state (hereinafter simply referred to as "a constant velocity state"). First, the calculation of the load torque $T_L$ in the acceleration state will be described. When disregarding an influence of a viscosity load in this calculation, a sum of an acceleration torque $I \cdot \alpha$ and the load torque $T_L$ is equal to the generated torque $T_m$ of the motor 106a in expression (1). The inertia moment I is known from the configuration of the drive mechanism, and the angular acceleration $\alpha$ can be calculated by time differentiation of variation time of the output from the hole IC 107. The generated torque $T_m$ of the motor 106a is represented by following expression (6).

$$T_m = K_t \cdot i \cdot \sin(2\pi ft - \phi) \quad (6)$$

In expression (6), symbol $K_t$ denotes a torque constant, i an electric current value of the excitation signal applied to the exciting coil of the motor 106a (the electric current value is hereinafter referred to as "an excitation current"), f a frequency of the excitation current i, and $\phi$ a phase delay of the excitation current. Use of expression (6) with a predetermined value of the excitation current I enables calculating the generated torque $T_m$ of the motor 106a. The generated torque $T_m$ of the motor 106a can be calculated also from an input voltage according to the Ohm's law. Thus, the load torque $T_L$ is calculated from a difference between the generated torque $T_m$ of the motor 106a calculated by expression (6) and the acceleration torque $I \cdot \alpha$ thereof.

Next, the calculation of the load torque $T_L$ in the constant velocity state will be described. The "constant velocity state" means a state in which there is no or little variation in the angular velocity of the motor 106a. In this embodiment, the control of the motor 106a in the constant velocity state includes a constant current control and a constant advance angle control.

The constant current control fixes the excitation current and controls a phase difference between a phase of the excitation current and a mechanical phase which is the rotational angle (rotational phase) of the rotor, namely, an advance angle to control the drive velocity or the torque. On the other hand, the constant advance angle control fixes the advance angle and increases/decreases the excitation current to control the drive velocity or the torque.

Figure 5:
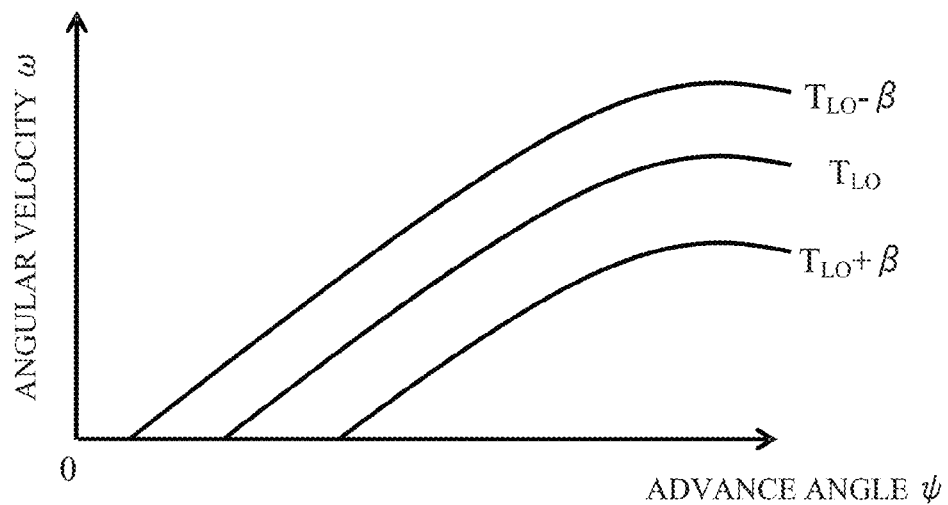
FIG. 5 illustrates a correlation between an advance angle $\psi$ and an angular velocity $\omega$ in Embodiment 1.
Figure 6:
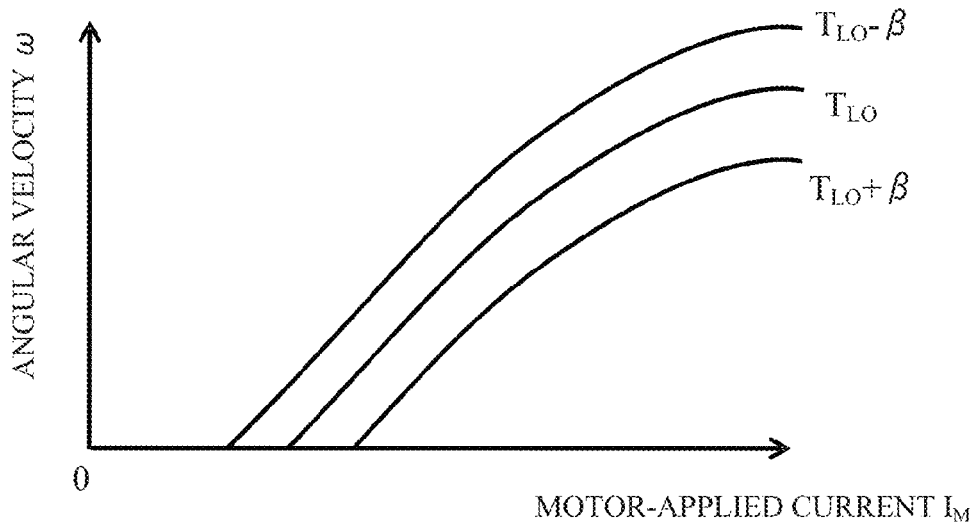
FIG. 6 illustrates a correlation between a motor-applied current $I_M$ and the angular velocity $\omega$ in Embodiment 1.

FIG. 5 illustrates a relation between the advance angle ψ and the angular velocity ω, which are measured when the load torque $T_L$ varies between $T_{LO}$ and $T_{LO} \pm \beta$, in the constant current control in which the excitation current applied to the motor 106a (denoted as "a motor-applied current $I_M$" in the drawing) is fixed. FIG. 6 illustrates a relation between the excitation current (motor-applied current $I_M$) and the angular velocity ω, which are measured when the load torque $T_L$ varies between $T_{LO}$ and $T_{LO} \pm \beta$, in the constant advance angle control of the motor 106a.

In FIG. 5, since the advance angle ψ and the angular velocity ω are in a proportional relation with each other, as the advance angle ψ increases, the torque generated by the motor 106a, that is, the generated torque thereof increases, which increases the angular velocity ω. However, the generated torque reaches its maximum when the advance angle ψ is approximately 90 [deg] and decreases when the advance angle ψ has a value exceeding 90 [deg]. The motor 106a loses its synchronization when the generated torque becomes smaller than the load torque.

In addition, in FIG. 5, when the load torque varies between $T_{LO}$ and $T_{LO} \pm \beta$, a gradient of a torque curve of the generated torque (that is, of an advance angle ψ-angular velocity ω curve) does not change and only an intercept value of the curve changes. Thus, the load torque $T_L$ in the constant current control can be estimated from the characteristics illustrated in FIG. 5, which is measured beforehand, by using the angular velocity ω and the advance angle ψ which are calculated from the output of the hole IC 107 and the excitation waveform applied to the exciting coil.

Approximately similarly to the case of the constant velocity control, the load torque $T_L$ in the constant advance angle control can be estimated from the characteristics illustrated in FIG. 6, which is measured beforehand, by using the angular velocity ω and the motor-applied current $I_M$ (or a voltage value) at an arbitrary timing.

As described above, the load torque $T_L$ can be estimated in both of the constant-velocity control and the constant advance angle control, which makes it possible to uniquely calculate the deceleration displacement angle θ by using the estimation result and expression (3).

Figure 7:
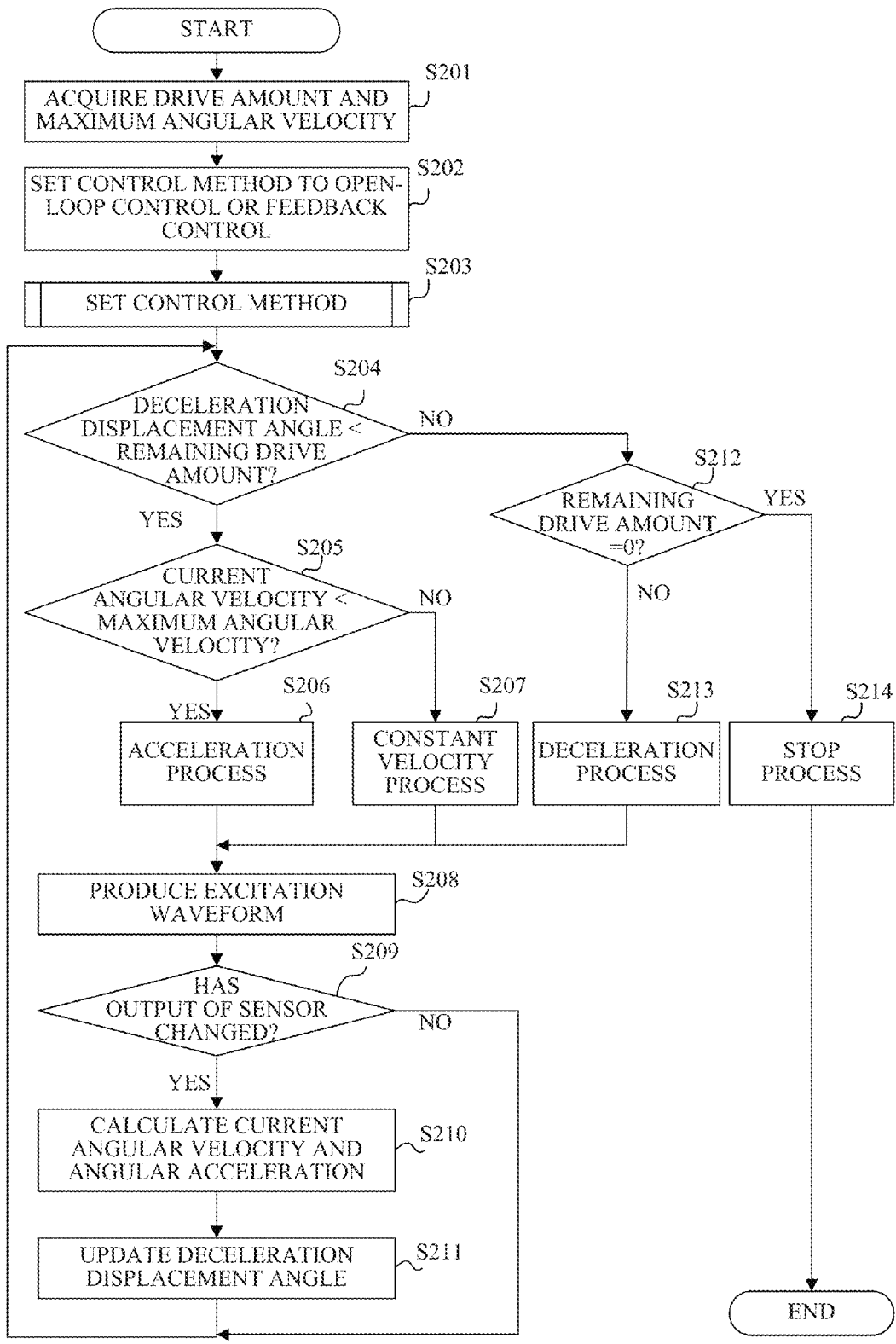
FIG. 7 is a flowchart illustrating a drive control operation for the focus lens in Embodiment 1.
Figure 8:
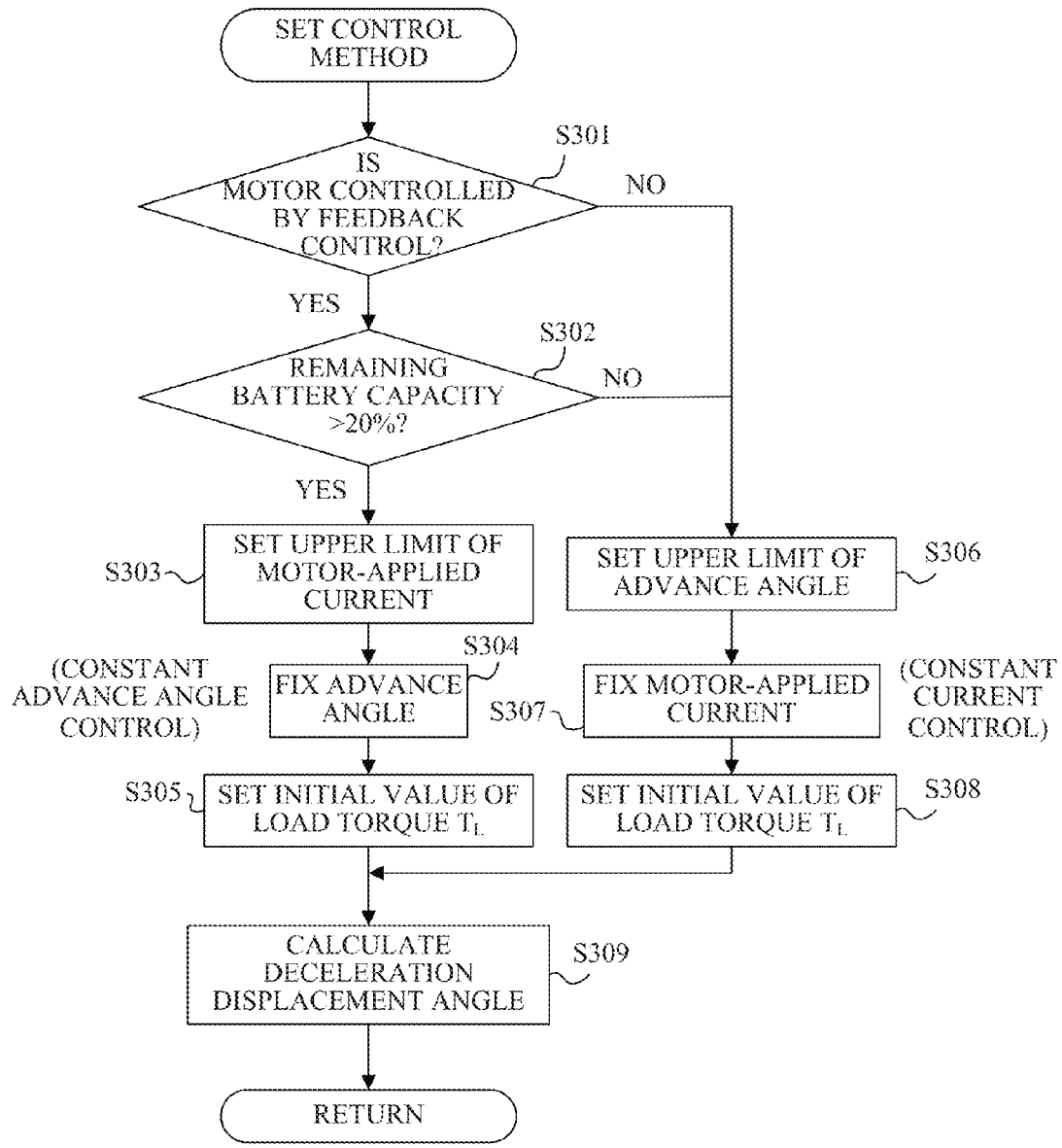
FIG. 8 is a flowchart illustrating an operation to switch a control method used in drive control of the focus lens between a constant current control and a constant advance angle control in Embodiment 1.

Next, the drive control of the focus lens 105 performed by the lens IC 111 in this embodiment, namely, the drive control of the motor 106a will be described using flowcharts of FIGS. 7 and 8. FIG. 7 illustrates an operation of the lens IC 111 to drive the focus lens 105 when the camera IC 118 provides to the lens IC 111 the focus lens drive instruction. FIG. 8 illustrates a sub-routine for setting of a control method which will be described at step S203 in FIG. 7. The lens IC 111 performs the drive control of the motor 106a according to a motor control program as a computer program.

At step 201, the lens IC 111 receives the focus lens drive instruction from the camera IC 118. Although the lens IC 111 receives from the camera IC 118 not only the focus lens drive instruction but also an instruction to drive the zoom lens 102, an instruction to drive the stop 103, an instruction to drive the image-stabilizing lens 104 and other instructions, the following description is made of only the operation in response to the focus lens drive instruction.

The focus lens drive instruction contains a maximum angular velocity $\omega_{max}$ in addition to the focus lens drive direction and the focus lens drive amount which are described above. The focus lens drive amount is a value other than 0, and the maximum angular velocity $\omega_{max}$ is a value equal to or larger than 1. The lens IC 111 receives a new focus lens drive instruction even during the drive of the focus lens 105 in response to the focus lens drive instruction.

At step S202, the lens IC 111 determines whether to perform the drive control of the motor 106a in this operation by the open-loop control or the feedback control based on the received focus lens drive amount and maximum angular velocity $\omega_{max}$. In this embodiment, the lens IC 111 selects the open-loop control when the focus lens drive amount is smaller than a predetermined amount or when the maximum angular velocity $\omega_{max}$ is in a medium-to-low velocity range which is slower than a predetermined angular velocity. On the other hand, the lens IC 111 selects the feedback control when the focus lens drive amount is larger than the predetermined amount and the maximum angular velocity $\omega_{max}$ is in a high velocity range which is faster than the predetermined angular velocity. This selection criterion is based on a fact that the stepping motor 106a, because of its characteristics, cannot be driven at the high velocity range without its advance angle ψ being appropriately controlled.

Next, at step S203, the lens IC 111 sets the control method used in the constant velocity state of the motor 106a to either one of the constant current control and the constant advance angle control. An operation to set the control method used in the constant velocity state will be described using the flowchart of FIG. 8.

At step S301, the lens IC 111 determines whether the control method for the drive control of the motor 106a selected (decided) at step S202 is the open-loop control or the feedback control. When determining that the control method selected is the open-loop control, the lens IC 111 selects the constant current control as the control method used in the constant velocity state. Since in the constant advance angle control the excitation waveform contains feedback information in order to fix the advance angle ψ, the lens IC 111 always selects the constant current control in the case of the open-loop control and then proceeds to step S306. On the other hand, when determining that the control method is the feedback control, the lens IC 111 proceeds to step S302 to select either one of the constant current control and the constant advance angle control by taking other criteria into consideration.

At step S302, the lens IC 111 checks a remaining capacity of a battery provided in the camera 100. When the remaining capacity of the battery is equal to or smaller than a predetermined percentage (e.g., 20% or smaller) of its maximum charge capacity, the lens IC 111 regards it as being a power shortage state and selects the constant current control. The lens IC 111 then proceeds to step S306. On the other hand, when the remaining capacity of the battery exceeds the predetermined percentage, the lens IC 111 selects the constant advance angle control and then proceeds to step S303.

At steps S303 to S305, the lens IC 111 performs settings for the constant advance angle control. First, at step S303, the lens IC 111 sets an upper limit for the excitation current (motor-applied current $I_M$). The upper limit may be the same value as a rated value of the motor 106a or may be set to a value smaller than the rated value when there are limitations due to simultaneous drive with other drivers or shortage in remaining battery capacity.

At steps S304, the lens IC 111 fixes the advance angle to a predetermined advance angle $ψ_C$. Consequently, the motor driver 106d produces an excitation waveform so as to maintain the fixed advance angle $ψ_C$.

At steps S305, the lens IC 111 sets an initial value of the load torque $T_L$. When the lens IC 111 has acquired the load torque in an immediately previous drive, the lens IC 111 sets the acquired value as the load torque $T_L$. On the other hand, when the lens IC 111 has not acquired such a load torque, the lens IC 111 sets, as the load torque $T_L$, a value acquired in a constant velocity process in a reset operation or a value acquired at factory adjustment. In this embodiment, the lens IC 111 has a function of entering a sleep state when no operation is performed from outside in a certain period of time and of always performing the reset operation when power is turned on after returning from the sleep state. When the lens IC 111 can estimate the load torque $T_L$ during the reset operation, a temperature variation in a time interval at least longer than the certain period of time to enter the sleep state can be disregarded, so that a variation in load torque $T_L$ can be suppressed even in the case of acquiring the value thereof during the reset operation.

At step S309, the lens IC 111 calculates the deceleration displacement angle θ by using expression (3). Since the angular velocity ω is equal to 0 in drive from the stop state, the lens IC 111 sets the deceleration displacement angle θ to 0. When the motor 106a is being driven, the lens IC 111 sets the deceleration displacement angle θ depending on the angular velocity ω.

On the other hand, at steps S306 to 308, the lens IC 111 performs settings for the constant current control. At step S306, the lens IC 111 sets an upper limit for the advance angle ψ to be variably controlled. In a condition in which, for example, the motor 106a has a load smaller than the generated torque or a limit is provided to the angular velocity in the drive of the motor 106a, the lens IC 111 sets an appropriate advance angle depending on that condition. Incidentally, the advance angle ψ satisfies a relation of 0<ψ<90 [deg].

At step S307, the lens IC 111 sets the excitation current (motor-applied current $I_M$) to be applied to the motor 106a as a fixed value.

At step S308, the lens IC 111 sets an initial value for the load torque $T_L$ as well as at step 305. The initial value is set to a load torque acquired during the immediately previous drive, the reset operation or the factory adjustment. After that, the lens IC 111 proceeds to step S309 to calculate the deceleration displacement angle θ. From step S309, the lens IC 111 proceeds to step S204 in FIG. 7.

At step S204, the lens IC 111 compares the deceleration displacement angle θ calculated using expression (3) with a current actual remaining rotation amount (hereinafter referred to as "a remaining drive amount"). Since the deceleration displacement angle θ is 0 at a first determination, the lens IC 111 proceeds to step S205. Since the remaining drive amount decreases each time the excitation waveform is produced, the lens IC 111 proceeds to step S212 when the remaining drive amount becomes equal to or smaller than the deceleration displacement angle θ.

At step S205, the lens IC 111 compares a current angular velocity ω with the maximum angular velocity $ω_{max}$ to decide whether to perform either one of an acceleration process and a constant velocity process. The lens IC 111 proceeds to step S206 to perform the acceleration process when the angular velocity ω has not reached the maximum angular velocity $ω_{max}$ and proceeds to step S207 when the angular velocity ω has reached the maximum angular velocity $ω_{max}$.

At step S206, the lens IC 111 performs the acceleration process for the motor 106a. More specifically, when the motor 106a is controlled by the open-loop control, the lens IC 111 accelerates the motor 106a at a predetermined acceleration characteristic, for example, at a constant angular acceleration. On the other hand, when the motor 106a is controlled by the feedback control, the lens IC 111 sets a frequency or an amplitude of the excitation waveform by using a difference between the maximum angular velocity $ω_{max}$ and the current angular velocity ω. The lens IC 111 then proceeds to step S208.

At step S207, the lens IC 111 performs the constant velocity process for the motor 106a. More specifically, irrespective of whether the motor 106a is controlled by the open-loop control or the feedback control, the lens IC 111 outputs an excitation waveform such that the angular velocity becomes the maximum angular velocity $\omega_{max}$. However, in the case where the feedback control is performed, the lens IC 111 outputs an excitation waveform such that a difference between the current angular velocity $\omega$ and the maximum angular velocity $\omega_{max}$ becomes zero when the angular velocity $\omega$ calculated from the output from the hole IC 107 changes. After that, the lens IC 111 proceeds to step S208.

At step S208, the lens IC 111 produces the excitation waveform via the motor driver 106d according to the acceleration process and the constant velocity process performed at steps S206 and S207 to drive the motor 106a.

Next, at step S209, the lens IC 111 determines whether the output from the hole IC 107 has changed from "Low" to "High" or from "High" to "Low". The lens IC 111 proceeds to step S210 to update various information if determining that the output has changed and proceeds to step S204 if determining that the output has not changed.

At step S210, the lens IC 111 calculates the angular velocity $\omega$ and the angular acceleration $\alpha$ by using the output from the hole IC 107. More specifically, the lens IC 111 calculates the angular velocity $\omega$ by using a lapse time from the last output from the hole IC 107 to this output therefrom. The lens IC 111 calculates the angular acceleration $\alpha$ by using a difference between the angular velocity $\omega$ calculated at the time of the last output from the hole IC 107 and that calculated at the time of this output. At this step, the lens IC 111 calculates the advance angle $\psi$ from the phase of the excitation waveform and the output from the hole IC 107.

Subsequently, at step S211, the lens IC 111 recalculates the deceleration displacement angle $\theta$. That is, the lens IC 111 substitutes the angular velocity $\omega$ and the angular acceleration $\alpha$ calculated (updated) at step S210 into expression (3) to calculate the deceleration displacement angle $\theta$.

On the other hand, at step S212, the lens IC 111 determines whether or not the remaining drive amount is 0. The lens IC 111 proceeds step S213 to perform the deceleration processing if determining that the remaining drive amount is not 0 and proceeds to step S214 to perform a stop process if determining that the remaining drive amount is 0.

At step S212, the lens IC 111 performs the deceleration process for the motor 106a. As well as in the acceleration process, the lens IC 111 decelerates the motor 106a under a predetermined characteristic when the motor 106a is controlled by the open-loop control and sets the frequency or the amplitude of the excitation waveform by using the difference between the maximum angular velocity $\omega_{max}$ and the current angular velocity $\omega$ when the motor 106a is controlled by the feedback control. In the feedback control, position control in which a position deviation, which is a difference between the remaining drive amount and the deceleration displacement angle $\theta$, is provided as a feedback signal may be used in a combined manner.

At step S214, the lens IC 111 performs the stop process for the motor 106a. That is, the lens IC 111 keeps the motor 106a in an energized state for a certain period of time and then shifts the motor 106a to a de-energized state to stop the motor 106a.

Figure 9:
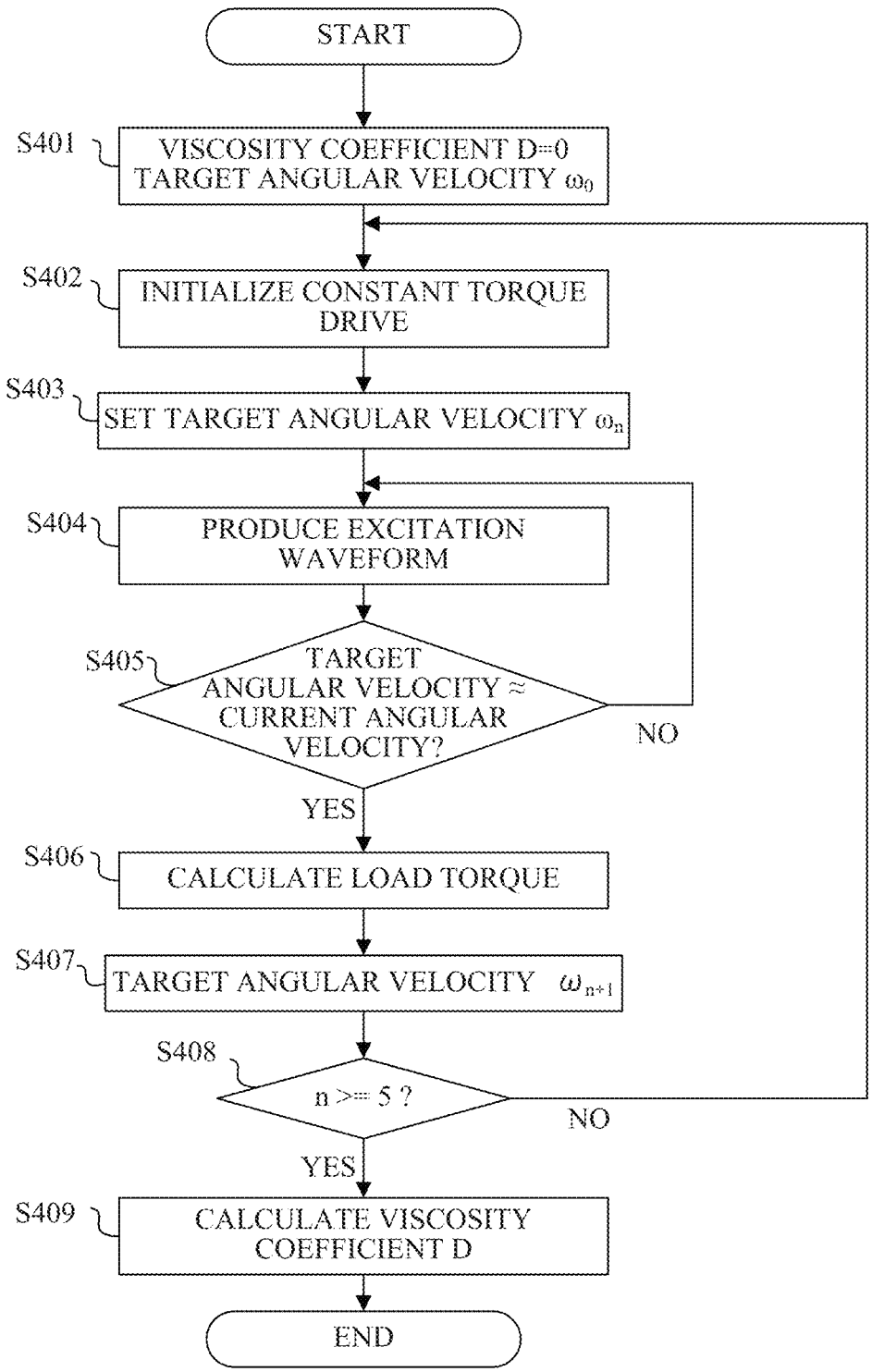
FIG. 9 is a flowchart illustrating an operation to calculate a viscosity coefficient in Embodiment 1.

FIG. 9 illustrates a flowchart showing a process to calculate a load component varying depending on a velocity including a viscosity resistance (the load component is hereinafter referred to as "a velocity-dependent load"). The lens IC 111 performs this process during the factory adjustment or during the reset operation of the motor 106a when the power is turned on to calculate the viscosity coefficient D represented by expression (1). Specifically, the lens IC 111 calculates the load torques at plural angular velocities (five angular velocities in this embodiment) while fixing the generated torque $T_m$ of the motor 106a and controlling each angular velocity to be constant. After that, the lens IC 111 calculates the viscosity coefficient D as a proportional coefficient from an increase rate of the load torque with respect to variation of the angular velocity.

At step S401, the lens IC 111 initializes both of the viscosity coefficient D and a target angular velocity $\omega_n$ (n=0).

At step S402, the lens IC 111 performs initial settings to drive the motor 106a at a constant torque. Since a counter-electromotive voltage to be applied to the motor 106a changes depending on the angular velocity at which the motor 106a is driven, the lens IC 111 sets an appropriate power rate and an excitation voltage according to the angular velocity.

At step S403, the lens IC 111 sets target angular velocities $\omega_n$ corresponding to n=1 to 5. For instance, the lens IC 111 sets the target angular velocities in order of 500, 1000, 1500, 2000 and 2500 [pps] in a 1-2 phase excitation.

At steps S404, the lens IC 111 produces excitation waveforms each having a predetermined frequency and a predetermined amplitude value based on the set values obtained at the previous steps to drive the motor 106a.

At step S405, the lens IC 111 determines whether or not the motor 106a reaches a constant velocity state at the target angular velocity $\omega_n$. That is, the lens IC 111 determines whether or not the current angular velocity calculated from the output from the encoder and the target angular velocity are equal or approximately equal to each other. The lens IC ill proceeds to step S406 if the motor 106a reaches the constant velocity state and proceeds to step S404 if not.

At step S406, the lens IC 111 calculates the load torque in the constant velocity state. Subsequently, at step S407, the lens IC 111 changes the current target angular velocity $\omega_n$ to a next target angular velocity $\omega_{n+1}$.

Next, at step S408, the lens IC 111 determines whether or not the calculation of the load torque measured for each of the five target angular velocities $\omega_n$ has completed. The lens IC 111 proceeds to step S409 if the calculation has completed and returns to step S402 if the calculations has not completed.

At step S409, the lens IC ill extracts the velocity-dependent load based on a relation between the five target angular velocities and the calculated load torques corresponding thereto and calculate the viscosity coefficient D.

Calculating thus the viscosity coefficient D makes it possible to take the first and second terms of expression (1) into consideration in the calculation of the load torque in the acceleration and constant velocity states described above. This allows the calculation of the load torque with a higher accuracy, which enables more strict calculation of the deceleration displacement angle $\theta$.

Although, in this embodiment, the deceleration displacement angle $\theta$ is updated at the timing of the change in the output of the hole IC 107, it may be updated at the predetermined time cycle as described above. In addition, since various variables including the load torque $T_L$, the angular velocity $\omega$ and the angular acceleration $\alpha$ are affected by sensor noise and processing delay, values obtained quantizing the variables may be used.

Moreover, as described above, the load torque $T_L$ may be segmented into elements and each element may be calculated. In particular, since the attitude of the camera 100 in this embodiment changes freely depending on image-capturing conditions, when a mass m of the focus lens 105, which is the driven member, is large, the mass m should be taken into consideration.

Furthermore, when the load torque $T_L$ varies depending on a position of the lead screw 106b and that of a sleeve (not illustrated) to be engaged with a guiding bar which guides the focus lens 105 in the optical axis direction, it is desirable to calculate the load torque $T_L$, taking an absolute position to which the focus lens 105 is driven into consideration. This makes it possible to obtain the deceleration displacement angle θ with a higher reliability.

Figure 10:
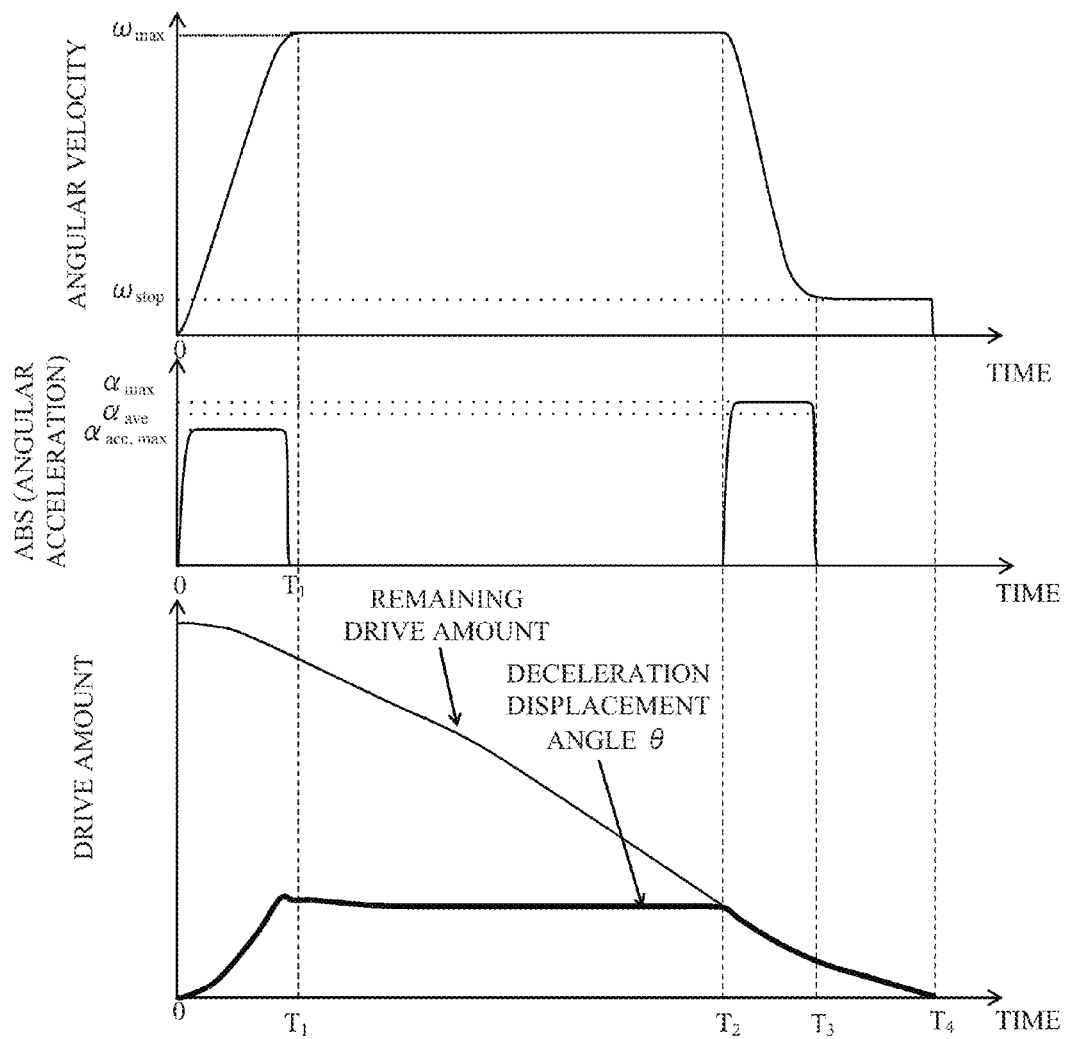
FIG. 10 illustrates a relation between an angular velocity $\omega$, an angular acceleration $\alpha$, a remaining drive amount, and a deceleration displacement angle in Embodiment 1.

FIG. 10 illustrates an example of the drive control of the motor 106a according to the flowchart of FIGS. 8 and 9. In FIG. 10, a vertical axis of a lower graph indicates the drive amount (remaining drive amount) of the motor 106a, a vertical axis of an upper graph indicates the angular speed thereof, and a vertical axis of a middle graph indicates an absolute value of the angular acceleration. Similarly, the lower graph also indicates the deceleration displacement angle θ to be updated at the timing of the change in the output of the hole IC 107. The deceleration of the motor 106a is started at the timing when the deceleration displacement angle θ and the remaining drive amount intersects with each other, namely, a deceleration start timing.

In this drive control example, after the drive of the motor 106a is started at time point 0, the motor 106a is accelerated to the acceleration target angular velocity $\omega_{max}$ in an acceleration section from time point $T_0$ to time point $T_1$. The motor 106a is then driven fixedly at the acceleration target angular velocity $\omega_{max}$ in a constant velocity section from time point $T_1$ to time point $T_2$ and is thereafter decelerated to the deceleration target angular velocity $\omega_{stop}$ to ensure a stop position accuracy in a deceleration section from time point $T_2$, which is the deceleration start timing, to time point $T_3$. Then, the motor 106a is driven fixedly at the deceleration target angular velocity $\omega_{stop}$ by a predetermined drive amount in another constant velocity section from time point $T_3$ to time point $T_4$ and is thereafter stopped at time point $T_4$. Decelerating the motor 106a to the deceleration target angular velocity $\omega_{stop}$ by time point $T_3$ prior to time point $T_4$, which is the stop timing, enables the motor 106a (the focus lens 105) to be stopped at the target stop position with a high stop position accuracy at time point $T_4$.

Details of each velocity control section illustrated in FIG. 10 will be described assuming that the viscosity coefficient D has been calculated. The lens IC 111 calculates the load torque from expression (1) in the acceleration section. However, since rotation of the motor 106a is not stable immediately after start of its drive, the lens IC 111 starts the calculation of the load torque after a lapse of a predetermined period of time from the start of the drive. The deceleration displacement angle θ calculated in the acceleration section from the load torque increases approximately proportional to the increase of the angular velocity as illustrated in the lower row of FIG. 10.

Next, in the constant-velocity section, the deceleration displacement angle θ calculated by the lens IC 111 is an approximately constant value. The remaining drive amount decreases in a gradient corresponding to the angular velocity and then intersects (coincides) with the deceleration displacement angle θ at time point (deceleration start timing) $T_3$, and thereafter the section shifts to the deceleration section. Time point $T_3$, which is the deceleration start timing, varies depending on the individual difference of the motor 106a and variation in operation environment.

In the deceleration section, as obvious from the angular velocity illustrated in the middle graph of FIG. 10, the absolute value of the angular acceleration is greater compared with that in the acceleration section. This is because the rack 106f is biased by a spring or the like with respect to the lead screw 106b and thus a braking force works well. That is, the results of dω/dt in expression (1) are different between in the acceleration and the deceleration; the result in the deceleration is greater than that in acceleration. Since the motor 106a has been decelerated to the deceleration target angular velocity $\omega_{stop}$ by time point $T_3$, the motor 106a can be stopped at the target stop position at time point $T_4$ without an overshoot with respect to the target stop position.

The magnitude of the braking force during the deceleration is defined depending on the structure of the drive mechanism of the focus lens 105 including the above-mentioned biasing force applied to the rack 106f with respect to the lead screw 106b. Thus, analyzing a magnitude of the angular velocity measured during the deceleration in terms of the structure, measuring the same in advance or estimating the same based on the characteristic of the angular velocity during the acceleration makes it possible to more appropriately set the deceleration displacement angle θ.

According to the above embodiment, the variation in load torque $T_L$ due to the variation factors such as the manufacturing variation, the aging variation, the temperature and the attitude are taken into consideration in addition to the angular velocity ω and the angular acceleration α which indicate the drive state of the motor 106a in the calculation (decision) of the deceleration displacement angle θ, in other words, a deceleration-section length. Such consideration can achieve a higher stop position accuracy by a non-redundant drive control. That is, since there is no excess and shortage in the deceleration section, an extra deceleration process is not required to be performed, which can ensure a high stop position accuracy while achieving a high velocity drive.

In other words, since the deceleration rotation amount is calculated depending on the individual difference of the motor, such as the manufacturing variation, and the load variation and then the deceleration of the motor is started at the timing corresponding to the deceleration rotation amount, it is possible to drive the driven member to the target stop position with a high stop position accuracy.

Although the above embodiment has described the case where the velocity control section shifts from the acceleration section, via the constant velocity section, to the deceleration section, the constant velocity section is not required to be provided in the case where, for example, the drive amount is small. That is, the acceleration section may be directly followed by the deceleration section. Also in this case, since the drive state of the motor 106a and the load torque variation are taken into consideration, the non-redundant drive control and the high stop position accuracy can be both achieved.

Moreover, unlike a general case where the feedback control is performed when an encoder is provided to a brushless motor, the motor drive control described in the above embodiment can be employed also in the case where the open-loop control is performed. Specifically, the encoder described in the above embodiment is used only as a means to measure the angular velocity ω and the angular acceleration α and as a means to decide the timing (deceleration start timing) to shift from the acceleration section or the constant-velocity section to the deceleration section. This configuration makes it possible, also in the open-loop control, to set a required deceleration section depending on the characteristics of individual motors and the conditions of the driven member.

Moreover, in a case where a driven member which can be freely driven in a predetermined drive range is driven similarly to the drive of the focus lens 105 described in the above embodiment and a load (load torque) thereof varies depending on its drive region in the predetermined drive range, it is desirable to calculate the deceleration displacement angle, taking the drive region into consideration as well. In such a case, when a variation amount of the load torque in the drive range is known, the load torque may be corrected using a function which contains a drive position of the driven member as a variable. This correction can provide a higher stop position accuracy.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-149986, filed Jul. 19, 2013, which is hereby incorporated by reference herein in its entirety.

What is claimed is:

1. A motor control apparatus for controlling rotation of a brushless motor, the motor control apparatus comprising:
a controller configured to control an angular velocity of the motor; and
a load torque calculator configured to calculate a load torque at which the motor drives a driven member, using a detection signal output from a rotation detector configured to output the detection signal in response to the rotation of the motor,
wherein the load torque is independent of the angular velocity of the motor and an angular acceleration of the motor, and
wherein the controller is configured to:
when the motor drives the driven member toward a target stop position, calculate a deceleration rotation amount based on the calculated load torque, the deceleration rotation amount being a remaining rotation amount of the motor at start of deceleration of the motor from its drive state, the drive state being one of an acceleration state or a constant velocity state; and
control the angular velocity of the motor based on the deceleration rotation amount using an open-loop control or a closed-loop control.

2. A motor control apparatus according to claim 1, further comprising an acceleration calculator configured to calculate an angular acceleration of the motor, by using the detection signal,
wherein the controller is configured to calculate the deceleration rotation amount by using the load torque and the angular acceleration calculated in the drive state.

3. A motor control apparatus according to claim 2, wherein the load torque calculator is configured to calculate the load torque from the angular acceleration calculated by the acceleration calculator in the acceleration state.

4. A motor control apparatus according to claim 1, wherein:
the controller is configured to perform, in the constant velocity state, a constant current control to fix an electric current value of an excitation signal to be applied to the motor; and
the load torque calculator is configured to calculate, in the constant current control, the load torque from a phase difference between a rotational phase of the motor and a phase of the excitation signal.

5. A motor control apparatus according to claim 1, wherein:
the controller is configured to perform, in the constant velocity state, a constant advance angle control to change a phase of an excitation signal to be applied to the motor for fixing an advance angle, the advance angle being a phase difference between a rotational phase of the motor and the phase of the excitation signal; and
the load torque calculator is configured to calculate, in the constant advance angle control, the load torque by using one of an electric current value of the excitation signal and an electric voltage value thereof.

6. A motor control apparatus according to claim 1, wherein the load torque calculator is configured to calculate, by using an amount of a variation in the load torque which occurs with a change of the angular velocity of the motor, a velocity-dependent load, which is a load that varies depending on the angular velocity, and to calculate the load torque by using the velocity-dependent load.

7. A motor-driven apparatus comprising:
a brushless motor;
a driven member to be driven by the motor; and
a motor control apparatus for controlling drive of the motor,
wherein the motor control apparatus comprises:
a controller configured to control angular velocity of the motor; and
a load torque calculator configured to calculate a load torque at which the motor drives a driven member, using a detection signal output from a rotation detector configured to output the detection signal in response to the rotation of the motor, wherein the load torque is independent of the angular velocity of the motor and an angular acceleration of the motor, and wherein the controller is configured to:
when causing the motor to drive the driven member toward a target stop position, calculate a deceleration rotation amount based on the calculated load torque, the deceleration rotation amount being a remaining rotation amount of the motor at start of deceleration of the motor from its drive state, the drive state being one of an acceleration state or a constant velocity state; and
control the angular velocity of the motor based on the deceleration rotation amount using an open-loop control or a closed-loop control.

8. A motor-driven apparatus according to claim 7, further comprising a temperature sensor configured to detect a temperature of the motor-driven apparatus,
wherein the load torque calculator is configured to calculate the load torque by using an output from the temperature sensor.

9. A motor-driven apparatus according to claim 7, wherein the load torque calculator is configured to correct the load torque depending on a drive position of the driven member.

10. A motor-driven apparatus according to claim 7, wherein the driven member is an optical element to be used in image capturing.

11. A motor-driven apparatus according to claim 10, further comprising an attitude sensor configured to detect an attitude of the motor-driven apparatus, the attitude showing a relation between a gravity direction and an optical axis direction of the optical element,
wherein the load torque calculator is configured to calculate the load torque by using an output from the attitude sensor.

12. A method for controlling rotation of a brushless motor, the method comprising:
calculating a load torque at which the motor drives a driven member, using a detection signal output in response to the rotation of the motor, wherein the load torque is independent of an angular velocity of the motor and an angular acceleration of the motor;
calculating, when the motor drives the driven member toward a target stop position, a deceleration rotation amount based on the calculated load torque, the deceleration rotation amount being a remaining rotation amount of the motor at start of deceleration of the motor from its drive state, the drive state being one of an acceleration state or a constant velocity state; and
controlling the angular velocity of the motor based on the deceleration rotation amount using an open-loop control or a closed-loop control.

13. A non-transitory computer-readable recording medium storing a computer program to cause a computer which controls rotation of a brushless motor to execute the following processes:
calculating a load torque at which the motor drives a driven member, using a detection signal output in response to the rotation of the motor, wherein the load torque is independent of an angular velocity of the motor and an angular acceleration of the motor;
calculating, when the motor drives the driven member toward a target stop position, a deceleration rotation amount based on the calculated load torque, the deceleration rotation amount being a remaining rotation amount of the motor at start of deceleration of the motor from its drive state, the drive state being one of an acceleration state or a constant velocity state; and
controlling the angular velocity of the motor based on the deceleration rotation amount using an open-loop control or a closed-loop control.

* * * * *